US010044221B2

(12) United States Patent
Rosenvard et al.

(10) Patent No.: US 10,044,221 B2
(45) Date of Patent: Aug. 7, 2018

(54) WIND TURBINE GENERATORS WITH POWER BACKUP SYSTEM

(71) Applicant: VESTAS WIND SYSTEMS A/S, Aarhus N (DK)

(72) Inventors: Paw Rosenvard, Gjern (DK); Lars Ulrich Nielsen, Viby J (DK); Sander J. Larsen, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 78 days.

(21) Appl. No.: 15/105,463

(22) PCT Filed: Nov. 28, 2014

(86) PCT No.: PCT/DK2014/050405
§ 371 (c)(1),
(2) Date: Jun. 16, 2016

(87) PCT Pub. No.: WO2015/090323
PCT Pub. Date: Jun. 25, 2015

(65) Prior Publication Data
US 2017/0018961 A1    Jan. 19, 2017

(30) Foreign Application Priority Data
Dec. 16, 2013  (DK) ................ 2013 70776

(51) Int. Cl.
*H02J 11/00*  (2006.01)
*H02J 9/00*  (2006.01)
(Continued)

(52) U.S. Cl.
CPC ............ *H02J 11/00* (2013.01); *F03D 7/0204* (2013.01); *F03D 9/25* (2016.05); *F03D 9/257* (2017.02);
(Continued)

(58) Field of Classification Search
CPC ... H02J 11/00; H02J 9/00; H02J 3/386; F03D 9/257; F03D 7/0204; F03D 9/25; Y02E 10/763
(Continued)

(56) References Cited

U.S. PATENT DOCUMENTS

| 2004/0010350 A1* | 1/2004 | Lof ........................ H02J 3/24 700/292 |
| 2009/0134625 A1* | 5/2009 | Altenschulte ........... H01B 7/14 290/44 |

(Continued)

FOREIGN PATENT DOCUMENTS

| EP | 2503146 A1 | 9/2012 |
| WO | 2013/091641 A1 | 6/2013 |

OTHER PUBLICATIONS

International Search Report for PCT/DK2014/050405, dated Jun. 3, 2015.
Danish Search Report for PA 2013 70776, dated Jul. 31, 2014.

*Primary Examiner* — Jared Fureman
*Assistant Examiner* — Win Htun
(74) *Attorney, Agent, or Firm* — Patterson + Sheridan, LLP

(57) ABSTRACT

Auxiliary power is required by each generator to orient the rotor blades to face the wind direction and also for other control and safety functions. This auxiliary power is normally extracted from the power generated within each wind turbine generator. During servicing, auxiliary power is supplied from neighbouring generators using dedicated low-voltage cables. In the event of a fault in the high-voltage cable, connecting one of the groups of generators to the sub-station, these low-voltage cables are used to supply the generators within this group with auxiliary power from the output of one or more of the generators, in the other group of generators.

17 Claims, 2 Drawing Sheets

Figure 1:
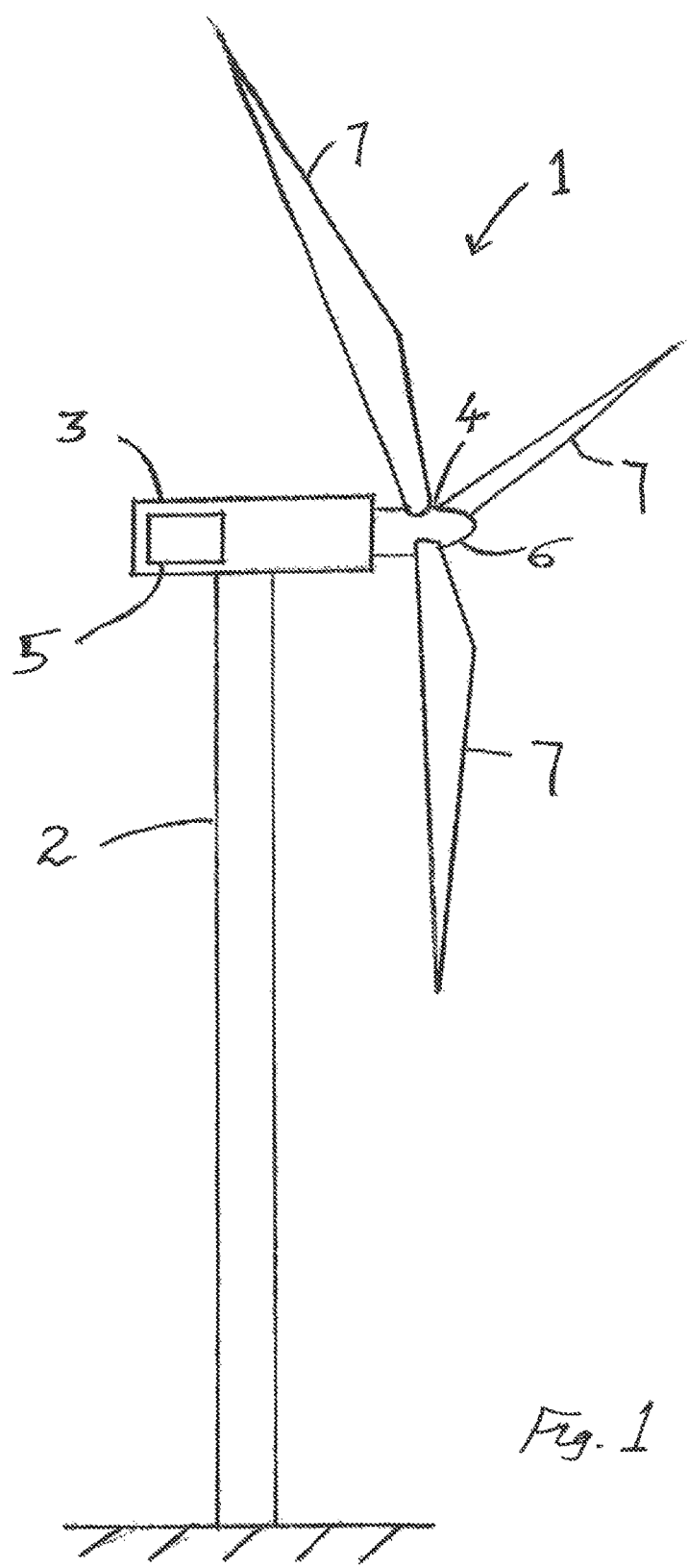

(51) Int. Cl.
  *H02J 3/38* (2006.01)
  *F03D 9/25* (2016.01)
  *F03D 7/02* (2006.01)

(52) U.S. Cl.
  CPC .............. *H02J 3/386* (2013.01); *H02J 9/00* (2013.01); *Y02E 10/763* (2013.01)

(58) Field of Classification Search
  USPC .......................................................... 307/23
  See application file for complete search history.

(56) References Cited

U.S. PATENT DOCUMENTS

| | | | |
|---|---|---|---|
| 2011/0140511 A1 | 6/2011 | Larsen | |
| 2011/0175355 A1* | 7/2011 | Rosenvard | F03D 7/048 290/44 |
| 2013/0154262 A1* | 6/2013 | Tripathi | F03D 7/026 290/44 |

* cited by examiner

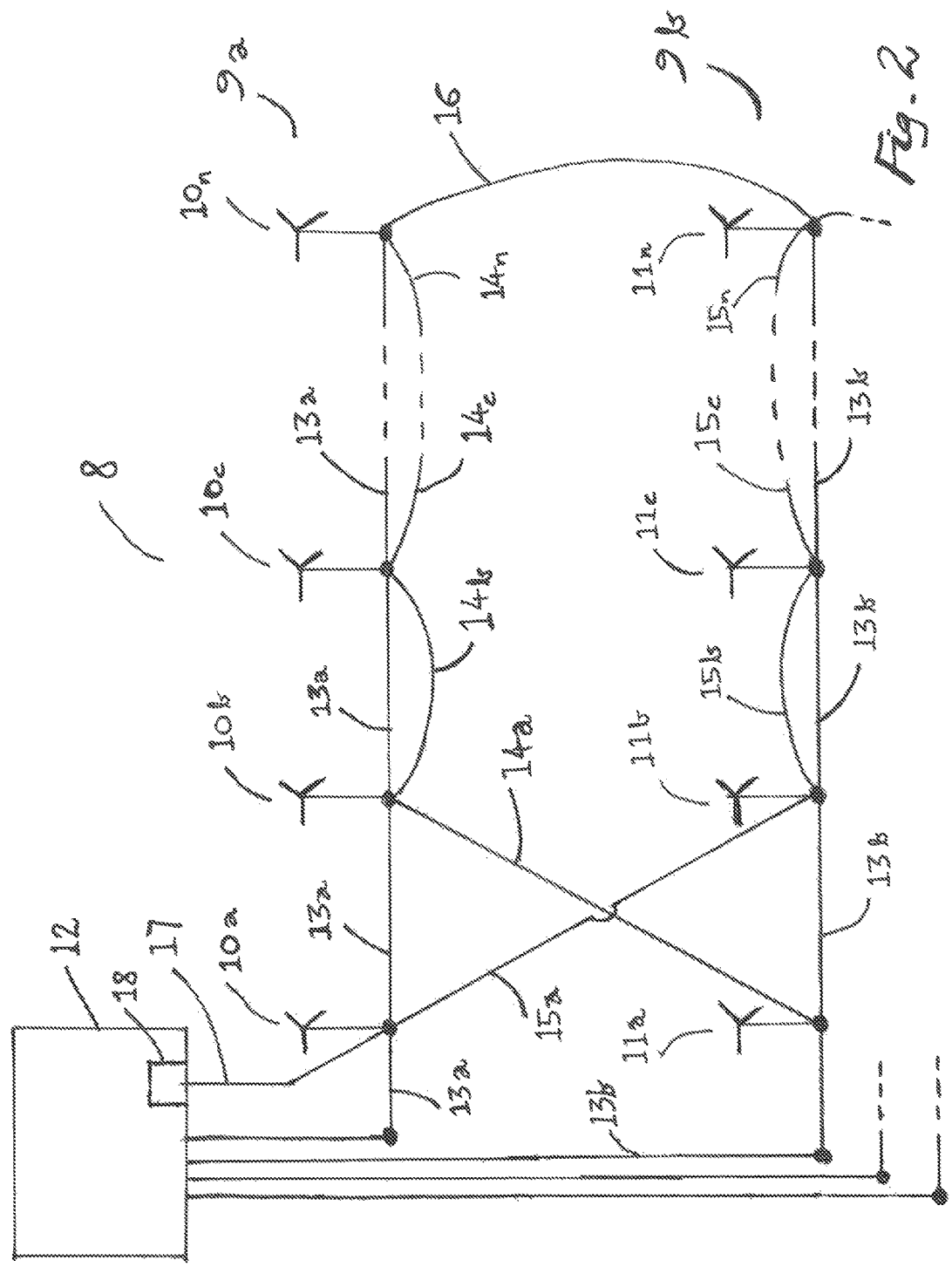

WIND TURBINE GENERATORS WITH POWER BACKUP SYSTEM

The present invention relates to wind turbine generators, and in particular to arrays of wind turbine generators connected to a sub-station of a mains electricity grid.

A typical wind turbine generator is illustrated in FIG. 1. The wind turbine generator 1 comprises a tower 2, a nacelle 3 mounted at top of the tower 2 and a rotor 4 operatively coupled to a generator 5 within the nacelle 3. The wind turbine 1 converts kinetic energy of the wind into electrical energy. In addition to the generator 5, the nacelle 3 houses the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7 of approximately planar configuration which extend radially outward from the central hub 6. In operation, the blades 7 are configured to interact with the passing air flow to produce lift that causes the central hub 6 to rotate about its longitudinal axis. Wind exceeding a minimum level will activate the rotor 4 and allow it to rotate within a plane substantially perpendicular to the direction of the wind. The rotation is converted to electric power by the generator 5 and is supplied to the mains electricity grid.

The nacelle 3 is mounted on the tower 2 by means of a coupling which permits the nacelle 3, and thereby also the blades 7, to rotate about a vertical axis, referred to as yaw rotation. The wind direction is sensed, thereby to establish a desired yaw angle of the blades 7. The current yaw angle is also sensed, and any deviation between the current yaw angle and the desired yaw angle is used to generate a control signal which is supplied to the electric motor to effect rotation of the blade assembly such that the blades 7 face the wind direction. By ensuring that the blades always face the wind direction, wind energy can be converted into electrical energy with optimum efficiency. In addition, this prevents damage to the wind turbines during storms which can arise when the wind is incident on the blades from the side.

The wind turbine generator 1 requires a source of auxiliary power for not only the electric motor which controls the rotation of the nacelle 3, but also for the various control and safety systems of the wind turbine generator 1. For example, one control system is arranged to generate data regarding the current status of the generator and to supply this data along a fibre optic cable to the sub-stations.

When the wind turbine generator 1 is operational and generating power, this auxiliary power can be generated by the wind turbine generator 1 itself. However, when the generator 1 is not operational, such as during conditions of low wind speed, or no wind, or in the event of a fault inside the turbine generator, the auxiliary power must be supplied by the grid.

In the event of a loss of connection to the grid, the auxiliary power is supplied by a battery, an uninterruptable power supply, a diesel generator or a combination of these within the tower 2 of the wind turbine generator 1. However, such sources of power are necessarily finite and therefore eventually require recharging, maintenance or replacement by service personnel, which is inconvenient and expensive, particularly when the wind turbine generator 1 is located offshore.

An array of such wind turbine generators 1 are electrically connected to the sub-station using high-voltage cables. Each cable is connected to a group of generators within the array, and the number of generators within each group is limited by the current-carrying capacity of the conductors to e.g. ten generators. A typical arrangement of wind turbine generators within a wind farm consists of a number of mutually isolated high-voltage cables spread out radially from a sub-station, each high-voltage cable being connected to a respective group of generators.

An arrangement for supplying a non-operational wind turbine generator with auxiliary power from the power generated by one or more neighbouring operational wind turbine generators within a group of generators is described in US 2009/0134625. This is achieved by a providing a low-voltage cable together with the conventional high-voltage cable within a common cable jacket. Thus, in the event of one or more generators developing a fault or undergoing a servicing operation, the auxiliary power necessary for that generator may be supplied from neighbouring generators without the need for an independent source of auxiliary power within the wind turbine itself.

One problem which may arise with such a system is that a fault in the high-voltage cable which connects the wind turbine generator to the sub-station, or a fault in the associated high-voltage switchgear, could render all of the generators within the group non-operational, in which case there would still be no source of auxiliary power to control the nacelle motor and to maintain the safety and control functions.

It would therefore be desirable to provide an arrangement which attempts to overcome, or at least mitigate, this problem.

Thus, in accordance with a first aspect of the present invention there is provided an array of wind turbine generators arranged in first and second groups, the generators within each group being connected to an electricity sub-station using respective first and second mutually isolated high-voltage cables, further comprising a first low-voltage cable connected between a first generator in the first group and a second generator in the second group, the arrangement being such that, in the event of a fault in the first high-voltage cable causing the first generator to be disconnected from the sub-station, auxiliary power can be supplied via the first low-voltage cable from the second generator to the first generator.

With such an arrangement, any fault occurring within the first high-voltage cable, or indeed any fault within the switchgear or transformers associated with the first group of generators, would still not prevent auxiliary power from being supplied to these generators.

It will further be appreciated that a major technical advantage of such an arrangement as compared with the arrangement described in US 2009/0134625 is that relatively inexpensive low-voltage cables can be retrofitted to existing conventional systems to achieve the benefits of the invention. In contrast, the arrangement described in US 2009/0134625 requires relatively expensive cables incorporating both high-voltage and low-voltage conductors to be connected between each of the wind turbine generators within a group and indeed fails to address the problems associated with a break or other fault occurring within a cable which connects an entire group of turbine generators to the sub-station.

In a preferred arrangement of the present invention, a first low-voltage cable is connected between the second generator and a plurality of generators in the first group.

Thus, in the event of a fault in the first high-voltage cable, auxiliary power may be supplied via the first low-voltage cable from the second generator to each of the plurality of generators in the first group. With such an arrangement, all of the auxiliary power required by the generators in the first group is supplied by a single generator, thereby enabling all of the remaining generators in the first group to supply a full power output to the sub-station.

In one such arrangement, the auxiliary power is supplied sequentially to each of the generators in the first group. This enables at least some of the power generated by the second generator to be supplied to the sub-station. In an alternative arrangement, the auxiliary power is supplied simultaneously to the generators in the first group. However, in this case, it will be appreciated that the second generator may generate insufficient residual power to be supplied to the sub-station.

A second low-voltage cable is preferably connected between a generator in the first group and a plurality of generators in the second group.

Correspondingly, in the event of a fault in the second high-voltage cable, auxiliary power may be supplied via the second low-voltage cable from the generator in the first group to each of the plurality of generators in the second group. Again, the auxiliary power may be supplied sequentially to each of the generators in the second group, or alternatively the auxiliary power may be supplied simultaneously.

Although it is envisaged that the auxiliary power is normally extracted from the power generated by the wind turbine generators, it would be possible for the auxiliary power to be generated at the sub-station. Thus, in one embodiment, a further low-voltage cable is connected between at least one of the generators and the sub-station, thereby enabling auxiliary power to be supplied via the further low-voltage cable to the generator(s) from the sub-station.

The invention may advantageously be applied to wind turbine generators of the type which comprises blades mounted on a nacelle and arranged for rotation about a substantially horizontal axis, the nacelle further being arranged to rotate about a substantially vertical axis, in which case the power for the nacelle rotation may be supplied from the auxiliary power.

In accordance with a second aspect of the present invention there is provided a method of operating an array of wind turbine generators arranged in first and second groups, the generators within each group being connected to an electricity sub-station using respective first and second mutually isolated high-voltage cables, the method comprising, in the event of a fault in the first high-voltage cable causing at least one of the first group of generators to be disconnected from the sub-station, supplying auxiliary power from at least one of the generators within the second group to one of the disconnected generators within the first group.

Preferred embodiments of the present invention will now be described with reference to the accompany drawings, in which:

FIG. 1 is a schematic representation of a wind turbine generator to which the present invention may be applied; and FIG. 2 illustrates schematically the layout of an array of wind turbine generators and cables in accordance with a preferred embodiment of the present invention.

Referring to FIG. 2, an array 8 of wind turbine generators is sub-divided into a plurality of groups of turbines of which only two 9a, 9b are shown, for the sake of clarity. Each group 9a, 9b comprises a number of generators 10a, 10b, 10c, . . . 10n; 11a, 11b, 11b, . . . 11n. The generators 10a, 10b, 10c, . . . 10n; 11a, 11b, 11c, . . . 11n within each group 9a, 9b, are connected to a sub-station 12 of the mains electricity grid via a respective high-voltage cable 13a, 13b. Thus, power generated by each of the wind turbine generators may be transmitted along these high-voltage cables 13a, 13b to the sub-station 12.

Each wind turbine generator 10a, 10b, 10c, . . . 10n; 11a, 11b, 11c, . . . 11n requires a source of auxiliary power to control a motor which rotates the rotor blades about a vertical axis so that the blades always face the wind direction, and also to maintain other control and safety functions of the generators. Such auxiliary power is required by each generator at all times, whether the generator is operational and generating power, or non-operational. When operational, the auxiliary power for each generator is extracted from the power generated by the respective generator.

However, when the generator is not generating power, for example in low-wind conditions or when the generator is undergoing a servicing operation, the auxiliary power is supplied from one or more of the neighbouring generators within the array 8 using one or more dedicated low-voltage cables 14a, 14b, 14c, . . . 14n; 15a, 15b, 15c, . . . 15n; 16.

Furthermore, in the event of a fault in one of the high-voltage cables, e.g. 13a, the auxiliary power is supplied to the generators 10a, 10b, 10c, . . . 10n within that group 9a from one or more of the operational generators, e.g. 11a, in a different group 9b, again using one or more of the dedicated low-voltage cables 14a, 14b, 14c, . . . 14n; 15a, 15b, 15c, . . . 15n; 16.

For example, in the event of a fault in the high-voltage cable 13a which normally connects the wind turbine generators 10a, 10b, 10c, . . . 10n within the first group 9a to the sub-station 12, auxiliary power is supplied to these generators 10a, 10b, 10c, . . . 10n from the power generated by one of the operational wind turbine generators 11a in the second group 9b along dedicated low-voltage cables 14a, 14b, 14c, . . . 14n. The auxiliary power may be supplied to these generators 10a, 10b, 10c, . . . 10n either sequentially or simultaneously.

Correspondingly, in the event of a fault in the high-voltage cable 13b which normally connects the wind turbine generators 11a, 11b, 11c, . . . 11n within the second group 9b to the sub-station 12, auxiliary power is supplied to these generators 11a, 11b, 11c, . . . 11n from power generated by one of the wind turbine generators 12a in the first group 9a along dedicated low-voltage cables 15a, 15b, 15c, . . . 15n, and again the auxiliary power may be supplied either sequentially or simultaneously.

An additional dedicated low-voltage cable 16 is connected between the two respective generators 10n, 11n furthest from the sub-station 12, enabling auxiliary power to be supplied from one or more of the generators in one of the groups, e.g. 9a, to one or more generators in the other group 9b. Corresponding low-voltage cables are connected between other pairs of generators furthest from the sub-station within the other pairs of groups (not shown).

A further dedicated low-voltage cable 17 supplies auxiliary power from a low-voltage power supply 18 within the sub-station 12 to one of the generators 10a within the array 8 as an alternative supply of auxiliary power to the generators.

Although the present invention has been described above by reference to preferred embodiments, it will be appreciated that variations and modifications of these embodiments can be made without departing from the scope of the invention which is defined solely by the claims below.

What is claimed is:

1. An array of wind turbine generators, comprising:
   a first group of wind turbine generators connected to an electricity sub-station using a first high-voltage cable;
   a second group of wind turbine generators connected to the electricity sub-station using a second high-voltage cable, wherein the first high-voltage cable is isolated from the second high-voltage cable; and
   a first low-voltage cable connected between a first wind turbine generator in the first group and a second wind turbine generator in the second group such that, in the event of a fault in the first high-voltage cable causing the first wind turbine generator to be disconnected from the electricity sub-station, auxiliary power is supplied via the first low-voltage cable from the second wind turbine generator to the first wind turbine generator, wherein the first low-voltage cable is rated for a lower voltage than the first high-voltage cable and the second high-voltage cable.

2. The array of wind turbine generators as claimed in claim 1, wherein the first low-voltage cable is connected between the second wind turbine generator and a plurality of wind turbine generators in the first group.

3. The array of wind turbine generators as claimed in claim 2, arranged such that, in the event of a fault in the first high-voltage cable, the auxiliary power is supplied via the first low-voltage cable from the second wind turbine generator sequentially to each wind turbine generator of the plurality of wind turbine generators in the first group.

4. The array of wind turbine generators as claimed in claim 2, arranged such that, in the event of a fault in the first high-voltage cable, the auxiliary power is supplied via the first low-voltage cable from the second wind turbine generator simultaneously to each wind turbine generator of the plurality of wind turbine generators in the first group.

5. The array of wind turbine generators as claimed in claim 4, further arranged to not supply power to the electricity sub-station when supplying the auxiliary power simultaneously to the plurality of wind turbine generators in the first group.

6. The array of wind turbine generators as claimed in claim 2, wherein a second low-voltage cable is connected between a wind turbine generator in the first group and a plurality of wind turbine generators in the second group.

7. The array of wind turbine generators as claimed in claim 6, arranged such that, in the event of a fault in the second high-voltage cable, the auxiliary power is supplied via the second low-voltage cable from the wind turbine generator in the first group sequentially to each wind turbine generator of the plurality of wind turbine generators in the second group.

8. The array of wind turbine generators as claimed in claim 6, arranged such that, in the event of a fault in the second high-voltage cable, the auxiliary power is supplied via the second low-voltage cable from the wind turbine generator in the first group simultaneously to each wind turbine generator of the plurality of wind turbine generators in the second group.

9. The array of wind turbine generators as claimed in claim 8, arranged to not supply power to the electricity sub-station when supplying the auxiliary power simultaneously to the plurality of wind turbine generators in the second group.

10. The array of wind turbine generators as claimed in claim 1, further comprising a further low-voltage cable connected between at least one wind turbine generator and the electricity sub-station, thereby enabling auxiliary power to be supplied via the further low-voltage cable to the at least one wind turbine generator from the electricity sub-station.

11. The array of wind turbine generators as claimed in claim 1, wherein each wind turbine generator comprises a nacelle arranged for rotation about a substantially vertical axis, wherein power for rotating the nacelle is supplied from the auxiliary power.

12. A method of operating an array of wind turbine generators arranged in a first group of generators and a second group of generators, wherein generators within the first group of generators are connected to an electricity sub-station using a first high-voltage cable and generators within the second group of generators are connected to the electricity sub-station using a second high-voltage cable that is isolated from the first high-voltage cable, the method comprising:
   in the event of a fault in the first high-voltage cable causing at least one generator of the first group of generators to be disconnected from the electricity sub-station, supplying auxiliary power from at least one of generator within the second group of generators to the at least one of the disconnected generators within the first group of generators.

13. The method of claim 12, wherein the auxiliary power is supplied sequentially to each disconnected generator of a plurality of generators in the first group.

14. An array of wind turbine generators arranged in a first group and a second group, the generators within the first group being connected to an electricity sub-station using a first high-voltage cable and the generators within the second group being connected to the electricity sub-station using a second high voltage cable that is isolated from the first high-voltage cable, the array comprising:
   a first low-voltage cable connected between a plurality of generators in the first group and a second generator in the second group, connected such that, in the event of a fault in the first high-voltage cable causing a first generator of the plurality of generators in the first group to be disconnected from the electricity sub-station, auxiliary power is supplied via the first low-voltage cable from the second generator to the first generator; and
   a second low-voltage cable connected between a third generator in the first group and a plurality of generators in the second group.

15. The array of wind turbine generators as claimed in claim 14, connected such that, in the event of a fault in the first high-voltage cable, the auxiliary power is supplied via the first low-voltage cable from the second generator in the second group sequentially to each generator of the plurality of generators in the first group.

16. The array of wind turbine generators as claimed in claim 14, wherein, in the event of a fault in the first high-voltage cable, the auxiliary power is supplied via the first low-voltage cable from the second generator in the second group simultaneously to each generator of the plurality of generators in the first group.

17. The array of wind turbine generators as claimed in claim 16, wherein the electricity sub-station is disconnected from power supply from the second generator when the second generator is supplying the auxiliary power simultaneously to the plurality of generators in the first group.

* * * * *